Figure 1:
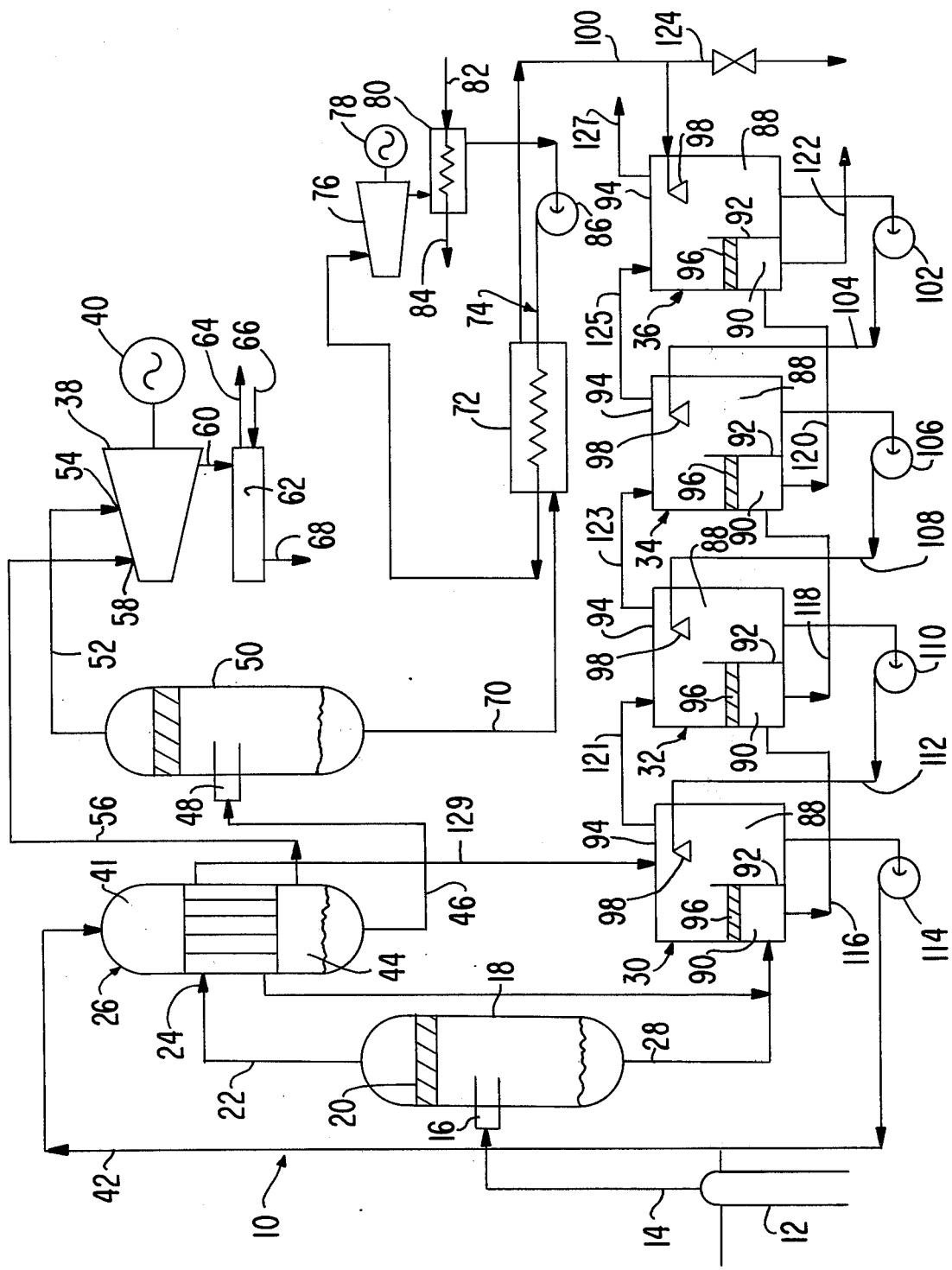

United States Patent [19]

Rogers et al.

[11] 4,138,851
[45] Feb. 13, 1979

[54] APPARATUS AND METHOD OF GEOTHERMAL ENERGY CONVERSION

[75] Inventors: Alfred N. Rogers, Pleasanton, Calif.; Leon Awerbuch, Tel Aviv, Israel

[73] Assignee: Bechtel International Corp., San Francisco, Calif.

[21] Appl. No.: 820,984

[22] Filed: Aug. 1, 1977

[51] Int. Cl.$^2$ .................. F01K 17/04; F03G 7/00
[52] U.S. Cl. ............................ 60/641; 60/648; 60/655; 203/11; 203/DIG. 16; 203/DIG. 20
[58] Field of Search .................. 60/641, 648, 655; 203/11, 173, DIG. 16, DIG. 20

[56] References Cited

U.S. PATENT DOCUMENTS

| | | | |
|---|---|---|---|
| 2,593,963 | 4/1952 | Biggs | 60/655 |
| 3,862,545 | 1/1975 | Ellis | 60/641 |
| 3,953,972 | 5/1976 | Awerbuch | 60/641 |
| 3,972,193 | 8/1976 | Sherwood | 60/641 |

*Primary Examiner*—Allen M. Ostrager
*Attorney, Agent, or Firm*—Townsend and Townsend

[57] ABSTRACT

A system using a number of flash chambers for converting the heat energy of geothermal brine to useful work. The system uses steam from flashed brine to vaporize a portion of distilled water or distillate in one or more heat exchangers to produce steam to drive a turbine which, in turn, operates a generator or the like to produce useful work. Before the distillate reaches the heat exchanger, it is preheated as it flows through a series of flash chambers in countercurrent relationship to the flow of geothermal brine therethrough. The brine flashes in each flash chamber and the flashed vapor mixes with the distillate flowing through the flash chamber to pre-heat the distillate. The heat energy of the unvaporized part of the distillate in the heat exchanger can form additional steam which is also supplied to the turbine. The heat content of the unflashed part of the distillate can be used in several ways to heat a working fluid in a closed loop containing a second turbine. The unflashed distillate can either be directed through a second heat exchanger which also receives a second working fluid so as to heat the latter, or the unflashed distillate can be flashed and the flashed vapor is placed in heat exchange relationship to the working fluid. Condensate formed in the latter case can be used as fresh product water. Inorganic salts from the brine can also be derived from the system.

20 Claims, 2 Drawing Figures

APPARATUS AND METHOD OF GEOTHERMAL ENERGY CONVERSION

This invention relates to the more efficient use of geothermal brine as a source of energy and, more particularly, to apparatus and a method for handling geothermal brine from a geothermal well in a manner to produce useful work, fresh product water and inorganic salts.

BACKGROUND OF THE INVENTION

A number of attempts have been made in the past to convert the heat energy of geothermal brine to useful work. Among the prior disclosures which illustrate these attempts are those set forth in the following U.S. Pat. Nos.: 3,021,265; 3,274,769; 3,457,144; 3,470,943; 3,489,652; 3,579,328; 3,681,920; 3,757,516; and 3,953,972. All of these patents illustrate the various ways in which the heat energy of geothermal brine can be used to provide steam for a turbine. Except for the last patent, all of the above patents disclose structure in which corrosive and scale-forming vapors derived from the geothermal brine actually contact the various parts of a turbine, thereby presenting a major problem with respect to deterioration of the turbine structure, such as the fan blades and the like. The last patent above discloses structure which is thermally inefficient inasmuch as hot working fluid, after having flashed so as to deliver steam to the turbine, is still at a relatively high temperature as it leaves the turbine so that a substantial part of the energy in the fluid is not used to produce useful work.

In view of the shortcomings of the prior art techniques, a need has arisen for an improved apparatus and a method of converting heat energy of geothermal brine to useful work in a manner to eliminate the shortcomings and to provide an efficient operating system.

SUMMARY OF THE INVENTION

The present invention satisfies the foregoing need by providing an apparatus and a method for handling geothermal brine in a manner to prevent corrosive and scale-forming gases and vapors from contacting the various structural parts of a turbine forming a part of the power plant of the system using the apparatus and method. Moreover, the apparatus and method permits a maximum amount of the heat energy of geothermal brine to be efficiently used so as to minimize the possibility of discarding heat energy from the power cycle of a geothermal power system which could otherwise be used to produce work. Furthermore, the apparatus and method of the present invention permits the reduction in capital costs of the heat transfer portion of a geothermal power plant. Thus, this invention, because of its economy and efficiency, makes it more practical to use the heat energy of geothermal brine to produce useful work, fresh product water and inorganic salts.

The system of the present invention meets the foregoing aims by providing a heat exchanger which receives a distilled water from a series of flash chambers. Steam flashed from geothermal brine is directed into heat exchange relationship to the distillate in the heat exchanger to form steam which is applied at the high pressure inlet of a turbine to drive the same; whereas, the residual distillate in the heat exchanger is flashed to provide additional steam which is applied to an intermediate pressure inlet of the same turbine. The geothermal brine itself is directed in countercurrent relationship to the flow of distillate in the flash chambers to produce flashed vapor which mixes with the distillate to pre-heat the same before it reaches the heat exchanger mentioned above.

The hot distillate after flashing to produce steam for the intermediate pressure inlet of the turbine is directed through a second heat exchanger to heat a working fluid in a closed loop. This working fluid, after being heated, drives a second turbine to produce additional useful work and the distillate from the second heat exchanger is then returned to the flash chambers coupled to the first heat exchanger. This second heat exchanger can be of the type which places the distillate in heat exchange relationship to the working fluid, or it can be a flash chamber which operates to place flashed vapor in heat exchange relationship to the working fluid. In both cases, the distillate is returned to the flash chambers which receive the geothermal brine so that the distillate is again pre-heated before flowing to the first-mentioned heat exchanger. Thus, a substantial part of the heat energy of geothermal brine is used in the system of the present invention, yet the system assures that substantially no corrosive and scale-forming gases contact the working parts of the turbines of the power plant of the system.

To illustrate this, a comparison of the operation of the system of U.S. Pat. No. 3,953,972 and the operation of the present system is helpful. In the patent, for example, in one power cycle, geothermal brine containing 1.329 weight percent of salt enters the system at 380° F. and transfers heat to distilled water. After flashing, each pound of brine transfers its thermal energy to 0.894 pounds of distilled water. The distilled water then flashes progressively down from 380° F. to 215° F. to yield steam to drive a turbine. Thus, of the 348.5 BTU originally available from each pound of geothermal brine, only 165.4 BTU is delivered to the turbine as steam.

In contrast, the system of the present invention supplied with the same geothermal brine discharges brine at 134.6° F. by flashing so as to effectively use 248.8 BTU from each pound of geothermal brine. This represents approximately a 50% improvement in energy use from the geothermal brine over that of the above-mentioned patent.

The primary object of the present invention is to provide apparatus and a method for converting heat energy of geothermal brine to useful work wherein the brine is used to heat a distillate to create steam substantially free of corrosive and scale-forming vapors so that the steam can be used to drive a turbine to produce useful work to thereby eliminate major problems associated with prior art systems.

Another object of the present invention is to provide apparatus and a method of the type describe wherein a substantial portion of the heat energy of geothermal brine is converted to useful work to eliminate the waste of energy associated with prior art systems which handle geothermal brine.

Another object of the present invention is to provide apparatus and a method of the aforesaid character wherein a distillate moves in heat exchange relationship to steam flashed from geothermal brine to heat the distillate to form steam substantially free of corrosive and scale-forming vapors so that the steam can be used to drive a first turbine to produce useful work and the unflashed portion of the distillate can be directed through a heat exchanger to transfer heat energy to a working fluid in a closed loop to operate a second turbine so as to further use the heat energy remaining in the distillate from the first turbine, all of which occurs after the distillate is preheated in a series of flash chambers in which geothermal brine flashes to produce flashed vapor containing the heat energy for pre-heating purposes.

Other objects of this invention will become apparent as the following specification progresses, reference being had to the accompanying drawings for an illustration of two embodiments of the invention.

IN THE DRAWING

Figure 2:
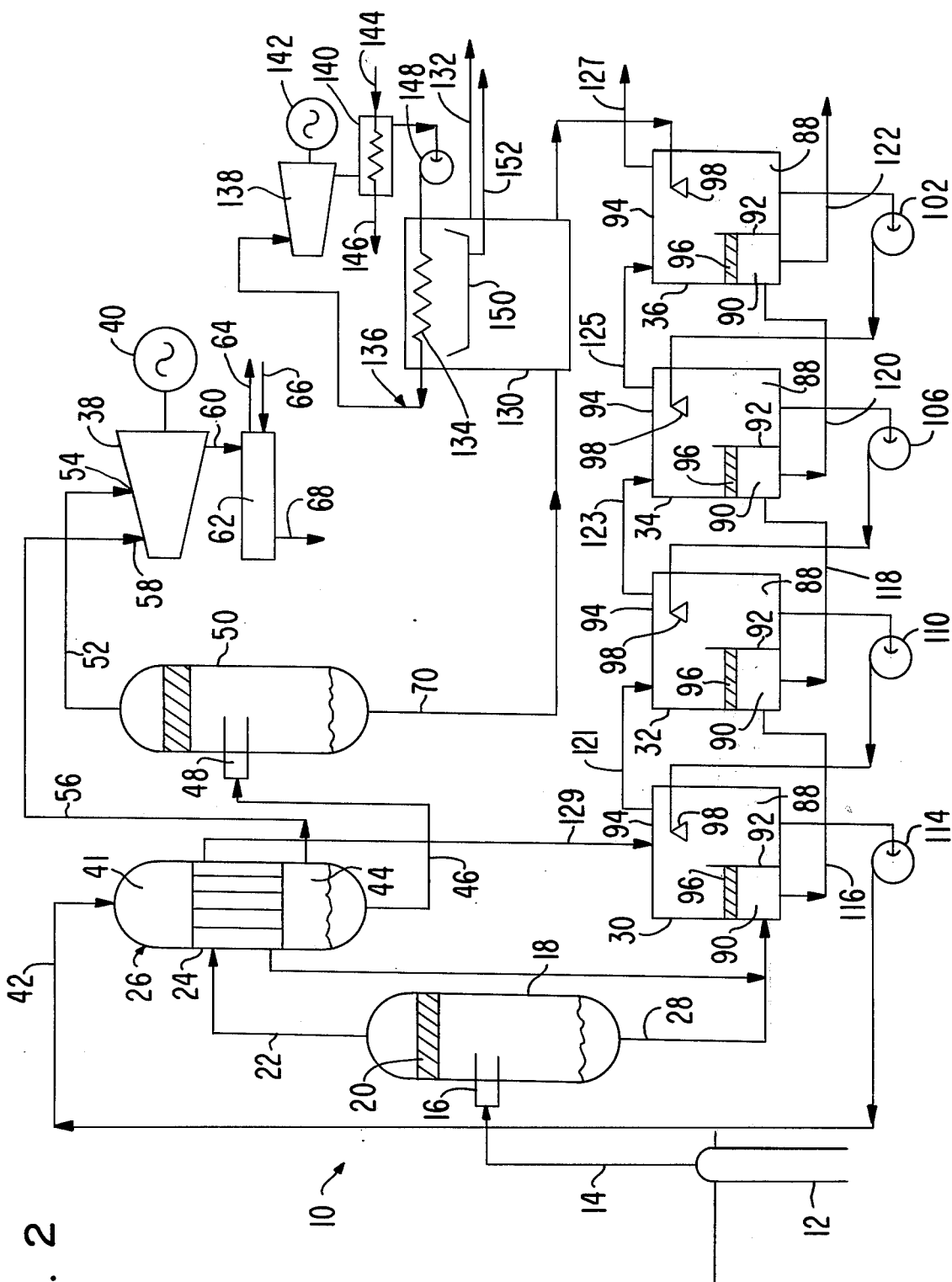

FIG. 1 is a schematic view of one embodiment of the geothermal energy conversion system of this invention; and FIG. 2 is a view similar to FIG. 1 but showing a modification of the system.

Energy conversion system 10 shown in FIG. 1 is adapted to be used with brine from a geothermal well 12, the outlet of the well being connected by a line 14 to the inlet 16 of a flash separator 18 having a mist eliminator 20 therein. Steam generated by the flashing of the brine in separator 18 rises through the mist eliminator and outwardly through a line 22 to the steam chest 24 of a heat exchanger 26. Steam is directed from separator 18 to heat exchanger 26 to transfer heat energy to a distilled water distillate to generate by heat exchange an additional amount of steam for supplying a turbine 38 in a manner hereinafter described.

Unflashed brine collected in separator 18 is directed out of the same along a line 28 to the first of a series of flash chambers 30, 32, 34 and 36 through which the above-mentioned distillate flows so that the distillate can be pre-heated before it reaches heat exchanger 26. The distillate enters the plenum 41 of heat exchanger 26 along a line 42 from flash chamber 30. The distillate falls through tubes extending through steam chest 24 of heat exchanger 26 and the steam entering the steam chest from line 22 condenses on the outer surfaces of the tubes, thereby transferring heat energy to the distillate to create steam which enters sump 44 of heat exchanger 26 with the unvaporized part of the distillate. In condensing, the steam directed into steam chest 24 gives up its latent heat to the distillate.

The heated distillate in sump 44 is directed along a line 46 to the inlet 48 of a flash separator 50. The distillate flashes in separator 50 because the latter is at a lower pressure than sump 44. This causes steam to be generated which is transmitted by line 52 to the intermediate pressure inlet 54 of turbine 38.

Steam in sump 44 of heat exchanger 26 is sent by way of line 56 to the high pressure inlet 58 of turbine 38. The turbine operates a generator 40 or other work-producing apparatus. The exhaust vapor from turbine 38 is directed along line 60 to a condenser 62 to which a coolant is supplied along lines 64 and 66. Condenser 62 produces a pure water condensate which is withdrawn therefrom along a line 68 and used as a fresh product water.

The unflashed portion of the distillate in flash separator 50 is directed along a line 70 to a heat exchanger 72 where it transfers heat energy to a working fluid flowing through a closed loop 74 and passing through heat exchanger 72. This heat energy vaporizes the working fluid so that it can drive a turbine 76 connected to a generator 78 to produce additional electrical energy or work. This working fluid may be, for example, isobutane, isopentane, one of the Freons, anhydrous ammonia, or water.

Loop 74 further includes a condenser 80 supplied with a coolant along lines 82 and 84 and to which the exhaust vapor from turbine 76 is directed. The condensate from condenser 80 is returned by a pump 86 to heat exchanger 72 so as to complete the cycle. The provision of loop 74, including turbine 76, permits the use of a fraction of the heat energy of the distillate leaving flash separator 50 which would otherwise go to waste as in geothermal energy systems of earlier design.

As the distillate flowing from line 70 passes through heat exchanger 72, it is substantially cooled because of its transfer of heat energy to the working fluid in loop 74. To re-heat this distillate, it is directed through flash chambers 30, 32, 34 and 36 in a direction opposite to the direction of brine flow through these flash chambers. When the brine flashes in each of these chambers, the resulting steam or vapor mixes with the distillate flowing through the flash chamber and heats the distillate.

Each of the flash chambers has two compartments 88 and 90 separated by a partition 92 spaced below the top 94 of the flash chamber. A mist eliminator 96 covers compartment 90 so that brine entering this compartment will flash to create steam which passes through the mist eliminator and enters compartment 88 for mixture with the distillate being sprayed into the latter compartment by a spray head 98. The internal pressures of the various flash chambers decreases as the brine proceeds from flash chamber 30 to flash chamber 36 to assure that flashing of the brine occurs in each flash chamber.

The distillate from the outlet of heat exchanger 72 is directed along line 100 to spray head 98 of flash chamber 36. The distillate sprayed into flash chamber 36 is collected in the bottom of compartment 88 thereof and is directed by a pump 102 along line 104 to the spray head 98 of flash chamber 34. Similarly, a pump 106 pumps the distillate from flash chamber 34 along a line 108 to the spray head 98 of flash chamber 32, and a pump 110 pumps the distillate from flash chamber 32 along a line 112 to the spray head 98 of flash chamber 30. While only four flash chambers have been shown in FIG. 1, it is to be understood that the number may be more or less than four, the total number being possibly as great as 65. A number of individual flash chambers may, for purposes of compactness and cost reduction, be assembled in a single housing or vessel so that each flash chamber may share a wall with a contiguous flash chamber.

Residual brine entering compartment 90 of flash chamber 30 flashes to form steam which enters compartment 88 of the same flash chamber to mix with the distillate spray from the corresponding head 98 to heat the water before it is pumped by a pump 114 along line 42 to heat exchanger 26. The residual brine in compartment 90 of flash chamber 30 is then directed along a line 116 to the compartment 90 of flash chamber 32 where it again flashes to repeat the process described above in connection with flash chamber 30. Residual brine is then directed along a line 118 to compartment 90 of flash chamber 34, and from the latter flash chamber along line 120 to compartment 90 of flash chamber 36. As the brine enters each compartment 90, it flashes to produce steam which mixes with the distillate spray in the adjacent compartment 88.

To maintain the required vacuum in the flash chambers, non-condensable gases from the flashed vapor cascade from chamber to chamber through lines 121, 123 and 125 after such gases have passed through the distillate sprays of the chambers. From flash chamber 36, the non-condensable gases pass through a line 127 for removal from the system by a vacuum pump (not shown). Noncondensable gases flow from the steam chest of heat exchanger 26 through a line 129 to flash chamber 30.

As the distillate progresses through the various flash chambers, it is progressively heated until it is heated sufficiently for entering heat exchanger 26 for further heating by heat transfer with the steam from flash separator 18. Concentrated brine leaves flash chamber 36 along a line 122 and is discharged from the system by a pump (not shown) as a blowdown stream which may be reinjected into the earth or can be further processed to recover inorganic salts therefrom. A portion of the cooled distillate flowing along line 100 from heat exchanger 72 may be drawn off by line 124 (FIG. 1) for use as distilled water where such is required. Moreover, this distillate can be mixed with the blowdown brine from line 122 to dilute the same to help prevent the formation of precipitants in the re-injection well. In the latter case, the distilled water product is not available for other uses.

When it is desired to withdraw the distilled water as a fresh water product and when a very high water purity is required at the point of use externally of the system, the modification of the system as shown in FIG. 2 is used. This modified system permits the withdrawal of double distilled water, i.e., water that has been distilled at two different places in the system, while, at the same time, it permits the recovery of a smaller fraction of the residual heat from the water leaving flash separator 50 since the final temperature of liquid discharged from the system is higher than in the process of the FIG. 1 system.

Residual hot distillate leaving flash separator 50 along line 70 is directed into and through a flash chamber 130 which is maintained at a reduced pressure by virtue by the removal of non-condensable gases therefrom by way of line 132 coupled to a vacuum system (not shown). Upon flashing, vapor is formed which condenses on the heat exchange tubing 134 forming a part of a closed loop 136 containing a turbine 138 and a condenser 140. Turbine 138 drives a work-producing apparatus, such as a generator 142. The condenser is supplied by a coolant flowing along lines 144 and 146. The loop is completed by a pump 148 which pumps a working fluid from condenser 140 into tubing 134, where it is vaporized and then passes through loop 136 into turbine 138.

A working fluid flowing through loop 136 is vaporized by the heat from the flashed vapor in flash chamber 130. The vaporized working fluid thus drives turbine 138 to energize generator 142 and thereby yield additional electrical power. Water vapor which condenses on the outer surfaces of tubing 134 falls into pan 150 and this double distilled water thus is withdrawn from the system by way of line 152. The remainder of the system operates in the same manner as that described above with respect to the system of FIG. 1.

We claim:

1. Apparatus for converting the heat energy of geothermal brine to useful work comprising: means defining a first fluid flow path for a distillate, said defining means including a first heat exchanger, a second heat exchanger, and a number of flash chambers coupled in series relationship; means adapted to be coupled to a geothermal well for forming steam from the heat content of the geothermal brine from the well; means coupled with said forming means for directing the steam into heat exchange relationship with the distillate flowing through the first heat exchanger to vaporize a portion of the distillate to generate steam free of corrosive and scale-forming compounds; means coupled with the first heat exchanger for directing the steam generated therein to a work-producing apparatus; and means coupled with said forming means for directing brine through the flash chambers in counterflow relationship to the flow of distillate therethrough to pre-heat the distillate before it reaches the first heat exchanger, said second heat exchanger adapted to be placed in heat exchange relationship to a second fluid flow path of a subsystem containing a work-producing unit so that heat energy can be transferred from the distillate flowing along said first path to a working fluid flowing along said second path.

2. Apparatus as set forth in claim 1, wherein is included a subsystem forming a closed loop containing a work producing unit, a condenser, and a fluid pump, the second heat exchanger forming a part of the closed loop.

3. Apparatus as set forth in claim 1, wherein said forming means comprises a flash separator having an inlet adapted to be coupled to a geothermal well for receiving geothermal brine therefrom.

4. Apparatus as set forth in claim 1, wherein said first heat exchanger comprises an evaporator selected from the group including vertical tube evaporators and horizontal tube evaporators.

5. Apparatus as set forth in claim 1, wherein the first heat exchanger has means for receiving residual distillate, and including a flash separator having an inlet coupled with the distillate-receiving means of the first heat exchanger for receiving distillate therefrom to permit the distillate to flash and to form additional steam for supplying said work-producing apparatus, the residual distillate from the flash separator being directed along said path to said second heat exchanger and to said flash chambers.

6. Apparatus as set forth in claim 1, wherein is included a turbine having a fluid inlet coupled to said first heat exchanger for receiving steam generated in the latter.

7. Apparatus as set forth in claim 1, wherein each flash chamber has a partition dividing the same into two compartments, one of the compartments being adapted to receive the distillate, the other compartment being adapted to receive geothermal brine, the compartments communicating with each other near the upper extremity of the partition to permit flashed vapor generated in said other compartment to mix with the flow of distillate in said one compartment.

8. Apparatus as set forth in claim 7, wherein each flash chamber has a spray head for spraying distillate in said one compartment thereof.

9. Apparatus as set forth in claim 1, wherein said defining means includes valve means for removing distillate from said path for use as fresh product water.

10. Apparatus as set forth in claim 1, wherein said second heat exchanger has a pair of passages therethrough in heat exchange relationship to each other, one of the passages being adapted to receive said distillate and the other passage being adapted to receive said working fluid.

11. Apparatus as set forth in claim 1, wherein said second heat exchanger includes a flash chamber having means defining a fluid flow passage for said working fluid, the said passage-defining means being in a location in said flash chamber to receive heat energy from the flashed vapor generated in said flash chamber when said distillate flows thereinto.

12. Apparatus as set forth in claim 11, wherein said flash chamber has means therein for collecting condensate, and means for directing condensate out of said flash chamber.

13. Apparatus for converting the heat energy of geothermal brine to useful work comprising: means defining a first fluid flow path for a distillate, said defining means including a first heat exchanger, a second heat exchanger, and a series of flash chambers coupled in series relationship, said second heat exchanger being downstream of the first heat exchanger and upstream of the flash chambers with reference to the direction of flow of distillate along said first path; means adapted to be coupled to a geothermal well for forming steam from the heat content of the geothermal brine from the well; means coupled with said forming means for directing the steam into heat exchange relationship with the distillate flowing through the first heat exchanger to vaporize a portion of the distillate to generate steam free of corrosive and scale-forming compounds; a first turbine; means coupled with the first heat exchanger for directing the steam generated therein to said turbine; means coupled with said forming means for directing brine through the flash chambers in counterflow relationship to the flow of distillate therethrough to preheat the distillate before it reaches the first heat exchanger; and means presenting a second fluid flow path for a working fluid, said presenting means including a second turbine, a condenser, and means forming a fluid flow passage through said second heat exchanger, the latter having means for causing at least a part of the heat energy of the distillate flowing therethrough to be transferred to the working fluid flowing in said passage.

14. Apparatus as set forth in claim 13, wherein said second heat exchanger has a pair of passages therethrough in heat exchange relationship to each other, one of the passages being adapted to receive said distillate and the other passage being adapted to receive said working fluid.

15. Apparatus as set forth in claim 13, wherein said second heat exchanger includes a flash chamber having means defining a fluid flow passage for said working fluid, the said passage-defining means being in a location in said flash chamber to receive heat energy from the flashed vapor generated in said flash chamber when said distillate flows thereinto.

16. Apparatus as set forth in claim 15, wherein said flash chamber has means therein for collecting condensate, and means for directing condensate out of said flash chamber.

17. A method of converting the heat energy of geothermal brine to useful work comprising: directing a distillate along a first closed path; moving a mass of steam derived from the geothermal brine into heat exchange relationship with the distillate at a first station along said first path to vaporize a portion of the distillate to form additional steam; causing the steam generated at said first station to flow to a second station and to produce useful work as a function of the heat energy of the steam; moving residual geothermal brine into a series of third stations along said first path; flashing the brine at each third station to form flashed vapor; mixing the vapor with the distillate at each third station to pre-heat the distillate before it reaches said first station; moving a working fluid in heat exchange relationship to the distillate as it flows from the first station toward said each third station; and directing the working fluid along a second path and through a fourth station to produce useful work as a function of the heat energy of the working fluid.

18. A method as set forth in claim 17, wherein said step of moving the working fluid in heat exchange relationship to said distillate includes directing said working fluid in close proximity to said distillate.

19. A method as set forth in claim 17, wherein said step of moving the working fluid in heat exchange relationship to said distillate includes flashing said distillate to form a flashed vapor, and allowing the flashed vapor to move in heat exchange relationship to said working fluid.

20. A method as set forth in claim 17, wherein is included the step of directing geothermal brine out of a geothermal well, and flashing said geothermal brine to generate said steam derived from geothermal brine and said residual geothermal brine.

* * * * *